(12) United States Patent
Matsuyama et al.

(10) Patent No.: US 8,779,642 B2
(45) Date of Patent: Jul. 15, 2014

(54) ELECTRIC POWER DISTRIBUTION MEMBER FOR STATOR AND METHOD OF MANUFACTURING THE SAME

(75) Inventors: Masaki Matsuyama, Osaka (JP); Yutaka Komatsu, Osaka (JP); Yasuhiro Endo, Okazaki (JP); Masao Okumura, Chiryu (JP); Takahiro Kayano, Mie-ken (JP)

(73) Assignees: Sumitomo Electric Industries, Ltd., Osaka-Shi, Osaka (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 402 days.

(21) Appl. No.: 13/144,846

(22) PCT Filed: Jan. 26, 2010

(86) PCT No.: PCT/JP2010/050938
§ 371 (c)(1),
(2), (4) Date: Jul. 15, 2011

(87) PCT Pub. No.: WO2010/095491
PCT Pub. Date: Aug. 26, 2010

(65) Prior Publication Data
US 2011/0278974 A1    Nov. 17, 2011

(30) Foreign Application Priority Data
Feb. 18, 2009    (JP) ................. 2009-035508

(51) Int. Cl.
*H02K 3/28*    (2006.01)
*H02K 3/50*    (2006.01)
*H02K 3/52*    (2006.01)

(52) U.S. Cl.
CPC .............. *H02K 3/522* (2013.01); *H02K 3/50* (2013.01); *H02K 3/52* (2013.01)
USPC ............... 310/71; 310/43; 310/179; 310/194; 310/416

(58) Field of Classification Search
CPC ........... H02K 3/28; H02K 3/50; H02K 3/522; H02K 15/00; H02K 15/028; H02K 3/52
USPC .................. 310/43, 71, 179, 194, 416; 29/596
IPC ............................ H02K 3/28, 15/00, 3/50, 3/52
See application file for complete search history.

(56) References Cited

U.S. PATENT DOCUMENTS

| | | | | |
|---|---|---|---|---|
| 2,407,935 | A * | 9/1946 | Perfetti et al. | 310/201 |
| 6,791,227 | B2 * | 9/2004 | Yasuhara et al. | 310/201 |
| 7,268,456 | B2 * | 9/2007 | Harada et al. | 310/201 |
| 7,569,958 | B2 * | 8/2009 | Matsuzaki et al. | 310/71 |

(Continued)

FOREIGN PATENT DOCUMENTS

| | | |
|---|---|---|
| CN | 1960124 A | 5/2007 |
| JP | 5-61993 | 8/1993 |

(Continued)

OTHER PUBLICATIONS

Chinese Office Action issued in Chinese Application No. 201080008362.5 dated May 17, 2013 with Partial English Translation.

*Primary Examiner* — John K Kim
(74) *Attorney, Agent, or Firm* — McDermott Will & Emery LLP (57) ABSTRACT

An electric power distribution member for stator is a member for connecting a plurality of coils to one another, each having coil opposing end portions located on an inner circumferential side and on an outer circumferential side in a radial direction of a stator, and it includes a plurality of conductor pieces and a plurality of insulating holding portions. The conductor piece has a first connection end portion in a flat plate shape connected to an inner circumferential side end portion of a coil and a second connection end portion in a flat plate shape connected to an outer circumferential side end portion of another coil. In addition, the insulating holding portion integrally holds adjacent conductor pieces at a distance from each other at a portion other than the opposing connection end portions of each conductor piece. The insulating holding portions are arranged in a manner discrete from one another.

11 Claims, 8 Drawing Sheets

(56) References Cited

U.S. PATENT DOCUMENTS

| | | | |
|---|---|---|---|
| 8,269,387 B2 * | 9/2012 | Endo et al. .................. 310/71 |
| 2005/0108870 A1 | 5/2005 | Harada et al. |
| 2007/0103014 A1 | 5/2007 | Sumiya et al. |
| 2009/0085421 A1 * | 4/2009 | Saito et al. .................. 310/214 |
| 2009/0096313 A1 * | 4/2009 | Harada et al. .............. 310/201 |
| 2011/0278974 A1 * | 11/2011 | Matsuyama et al. ........ 310/71 |

FOREIGN PATENT DOCUMENTS

| | | |
|---|---|---|
| JP | 2001-103700 | 4/2001 |
| JP | 2004-066667 | 3/2004 |
| JP | 2004-096841 | 3/2004 |
| JP | 2005-160143 | 6/2005 |
| JP | 2005-304244 | 10/2005 |
| JP | 2006-333684 | 12/2006 |
| JP | 2007-104812 | 4/2007 |
| JP | 2007-129847 | 5/2007 |
| JP | 2008-312290 A | 12/2008 |
| JP | 2009-017666 | 1/2009 |
| WO | WO 2007108552 A1 * | 9/2007 |
| WO | WO 2008/152966 A1 | 12/2008 |
| WO | WO 2008152966 A1 * | 12/2008 |

* cited by examiner

ELECTRIC POWER DISTRIBUTION MEMBER FOR STATOR AND METHOD OF MANUFACTURING THE SAME

RELATED APPLICATIONS

This application is the U.S. National Phase under 35 U.S.C. §371 of International Application No. PCT/JP2010/050938, filed on Jan. 26, 2010, which in turn claims the benefit of Japanese Application No. 2009-035508, filed on Feb. 18, 2009, the disclosures of which Applications are incorporated by reference herein.

TECHNICAL FIELD

The present invention relates to an electric power distribution member for stator utilized for connecting coils of a stator representing a constituent member of a rotating electric machine (a motor), a method of manufacturing this electric power distribution member, an attachment structure of this electric power distribution member, and a stator including this attachment structure. In particular, the present invention relates to an electric power distribution member for stator achieving improved mountability on a stator.

BACKGROUND ART

Demands for hybrid cars or electric cars have recently grown rapidly and further increased demands therefor are expected also in the future. Such a car includes a motor as a drive source. A stator is one of members constituting such a motor and a stator is generally structured to include a stator core constituted of an annular yoke and teeth centripetally extending from this yoke, a coil formed of a winding wound around each tooth of this stator core, and an electric power distribution member for connecting the coils.

Japanese Patent Laying-Open Nos. 2005-160143, 2004-96841, 2006-333684, and 2007-104812 (Patent Documents 1 to 4) describe such an electric power distribution member. For example, according to Patent Document 1, one end portion of a coil is located on an inner circumferential side in a radial direction of a stator and the other end portion thereof is located on an outer circumferential side in the radial direction of the stator, a crossing member is arranged to connect an inner circumferential side end portion of a coil and an outer circumferential side end portion of another coil to each other, and the coils are connected to each other through the crossing member.

In addition, Japanese Patent Laying-Open No. 2005-304244 (Patent Document 5) describes adoption as a coil of a stator, a coil formed by employing a flat-type wire as a winding and winding this wire edgewise.

PRIOR ART DOCUMENTS

Patent Documents

Patent Document 1: Japanese Patent Laying-Open No. 2005-160143

Patent Document 2: Japanese Patent Laying-Open No. 2004-96841

Patent Document 3: Japanese Patent Laying-Open No. 2006-333684

Patent Document 4: Japanese Patent Laying-Open No. 2007-104812

Patent Document 5: Japanese Patent Laying-Open No. 2005-304244

SUMMARY OF THE INVENTION

Problems to be Solved by the Invention

With growing demands, however, improvement in productivity has been required.

According to a conventional method of connecting coils of a stator using crossing members above, an operation for arranging a crossing member between an inner circumferential side end portion of a coil and an outer circumferential side end portion of another coil should be performed repeatedly for each crossing member (18 in Patent Document 1). Therefore, an operation for connecting the coils in a stator has been time consuming and improvement has been demanded.

In particular, recently, adoption of an edgewise coil described in Patent Document 5 as a coil of a stator has been considered, and an electric power distribution member suitable for mass production of such a stator has been demanded.

The present invention was made in view of the circumstances above, and one object of the present invention is to provide an electric power distribution member for stator achieving improved mountability on a stator.

Another object of the present invention is to provide a method of manufacturing the electric power distribution member for stator above, an attachment structure of this electric power distribution member, and a stator including this attachment structure.

Means for Solving the Problems

<Electric Power Distribution Member>

An electric power distribution member for stator according to the present invention is a member for connecting a plurality of coils, opposing end portions of the coil of the stator being located on an inner circumferential side and on an outer circumferential side in a radial direction of the stator respectively. The electric power distribution member for stator includes a plurality of conductor pieces each having a first connection end portion in a flat plate shape connected to an inner circumferential side end portion of a coil and a second connection end portion in a flat plate shape connected to an outer circumferential side end portion of another coil, and a plurality of insulating holding portions for integrally holding the plurality of conductor pieces at a distance from one another at a portion other than opposing connection end portions of each conductor piece. In addition, the insulating holding portions are arranged in a manner discrete from one another.

According to this structure, since a plurality of conductor pieces are coupled and integrated by the insulating holding portions, opposing connection end portions of each conductor piece can readily be arranged at once at end portions of each coil and mountability of the electric power distribution member on the stator can be improved. In addition, since the adjacent conductor pieces are held by the insulating holding portion at a distance from each other, contact between the conductor pieces can be suppressed even when vibration occurs when the motor is driven.

A more preferred form of the present invention is a structure including a coupling portion for annularly coupling the plurality of insulating holding portions.

It is difficult for an insulating holding portion alone to annularly hold a plurality of conductor pieces. Then, by providing such a coupling portion, an annular shape can reliably be maintained and mountability of the electric power distribution member on the stator can further be improved. The coupling portion should only have strength sufficient for maintaining the annular shape, and hence a cross-sectional area thereof in a direction orthogonal to a circumferential direction can be smaller than that of the insulating holding portion and an amount of a material used does not significantly increase.

Insulating and heat-resistant resins, for example, engineering plastics such as polyphenylene sulfide (PPS), liquid crystal polymer (LCP), polyamide (PA), polybutylene terephthalate (PBT), polyamide 6T (PA6T, trade name: 6T nylon), polyamide 66 (PA66, trade name: 66 nylon), and polyethylene terephthalate (PET), may be used for the insulating holding portion. In addition, in an example where a coupling portion is included, the coupling portion can be made of a material the same as that for the insulating holding portion, and the coupling portion and each insulating holding portion may be integrally molded.

In addition, preferably, at least one of the insulating holding portions has an engagement portion for positioning with respect to the stator. In mounting the electric power distribution member on the stator, this engagement portion is engaged with a locking portion provided in the stator, so that the electric power distribution member can accurately be positioned with respect to the stator. Therefore, opposing connection end portions of each conductor piece can accurately be arranged at positions corresponding to end portions of each coil and mountability of the electric power distribution member on the stator can further be improved. Moreover, as this engagement portion is fixed to the stator, displacement of a position of another conductor piece during an operation for connecting a conductor piece to end portions of each coil can be suppressed. From a point of view of positioning and fixing the electric power distribution member, this engagement portion is preferably provided in a plurality of (for example, three or more) insulating holding portions.

A round wire, a flat-type wire or the like can be used for a conductor piece. Since such a conductor wire can be obtained without punching a conductive plate material, material loss is small and yield can be improved. It is noted that opposing connection end portions of a conductor piece are shaped like a flat plate. By thus shaping the opposing connection end portions like a flat plate, an area for joint to each coil end portion can be increased and an operation for connection with each coil end portion by welding or soldering is facilitated. Use of a flat-type wire for a conductor piece eliminates the need for working the opposing connection end portions in a flat plate shape or the like, and therefore a flat-type wire is preferably used for a conductor piece.

In addition, preferably, the conductor piece has an insulating coating. As the conductor piece has such an insulating coating, insulation can be ensured even if a conductor piece comes in contact with another conductor piece or a coil when the motor is driven.

In addition, at least one of the insulating holding portions preferably has a grip portion to be gripped by a manipulator. When an operation for mounting the electric power distribution member on the stator is automated for improvement in productivity, it is necessary to lift the electric power distribution member with a manipulator. If the conductor piece is gripped, however, an insulating coating, an antioxidant film or the like in that portion may peel off and electrical characteristics of the conductor piece may deteriorate. Then, for example, if a projection portion or a groove portion is formed on each of inner and outer circumferential sides in a radial direction of the stator and a grip portion is provided in the insulating holding portion, it becomes easier to grip the insulating holding portion and disadvantages caused by lifting the electric power distribution member can be overcome.

By providing an engagement portion or a grip portion as described above in the insulating holding portion, an operation for mounting the electric power distribution member on the stator is readily automated.

<Manufacturing Method>

The electric power distribution member for stator according to the present invention can be manufactured in the following steps:

1) Preparing a plurality of conductor pieces each having a first connection end portion in a flat plate shape connected to an inner circumferential side end portion of a coil and a second connection end portion in a flat plate shape connected to an outer circumferential side end portion of another coil;

2) A conductor piece arrangement step of annularly arranging the conductor pieces in a mold; and 3) An insulating holding portion forming step of forming a plurality of insulating holding portions for integrally holding the plurality of conductor pieces at a distance from one another at a portion other than opposing end connection portions of each conductor piece, by introducing resin in the mold.

In addition, in an example where a coupling portion is included, in the insulating holding portion forming step, each insulating holding portion and a coupling portion for annularly coupling these insulating holding portions are preferably integrally molded.

By utilizing such a manufacturing method, electric power distribution members in which a plurality of annularly arranged conductor pieces are integrated by insulating holding portions can be manufactured at once. In addition, even when a coupling portion is included, efficient production can be achieved without increasing the number of steps.

<Attachment Structure>

An attachment structure of the electric power distribution member for stator according to the present invention includes such a structure that opposing end portions of a coil of a stator have a flat plate shape and each connection end portion of a conductor piece is connected by welding to an end portion of each coil.

If opposing end portions of the coil have a flat plate shape, an area of contact with each connection end portion of the conductor piece can be increased and welding between each connection end portion of the conductor piece and an end portion of each coil is facilitated. In addition, by adopting welding in connecting each connection end portion of a conductor piece and an end portion of each coil, mechanical strength at a joint portion can be enhanced as compared to soldering. For example, TIG (Tungsten Inert Gas) welding, resistance welding, projection welding, fusing, and the like can suitably be utilized as welding.

In addition, in the connection structure above, preferably, each connection end portion of a conductor piece is connected to an end portion of each coil such that the first connection end portion of the conductor piece is arranged on an inner circumferential side relative to the inner circumferential side end portion of a coil and the second connection end portion is arranged on an outer circumferential side relative to the outer circumferential side end portion of another coil.

By thus determining arrangement of each connection end portion of a conductor piece with respect to a position of an end portion of each coil, a distance between each connection end portion of a conductor piece and an adjacent conductor piece can be made greater. Therefore, in connecting a conductor piece and an end portion of each coil to each other, for example, by welding, insertion of a fixing jig for clamping and fixing the connection end portion of the conductor piece and the end portion of the coil from opposing sides at opposing positions of a welding nozzle is facilitated and an operation for connecting the conductor piece to the end portion of each coil is facilitated.

Further, by utilizing this attachment structure, a stator achieving high productivity can be realized.

Effects of the Invention

In the electric power distribution member for stator according to the present invention, since a plurality of conductor pieces are coupled and integrated by the insulating holding portions, mountability on the stator is excellent.

MODES FOR CARRYING OUT THE INVENTION

An embodiment of the present invention will be described with reference to the drawings. It is noted that a stator utilized in a three-phase AC motor will be described by way of example in the present embodiment.

Figure 1:
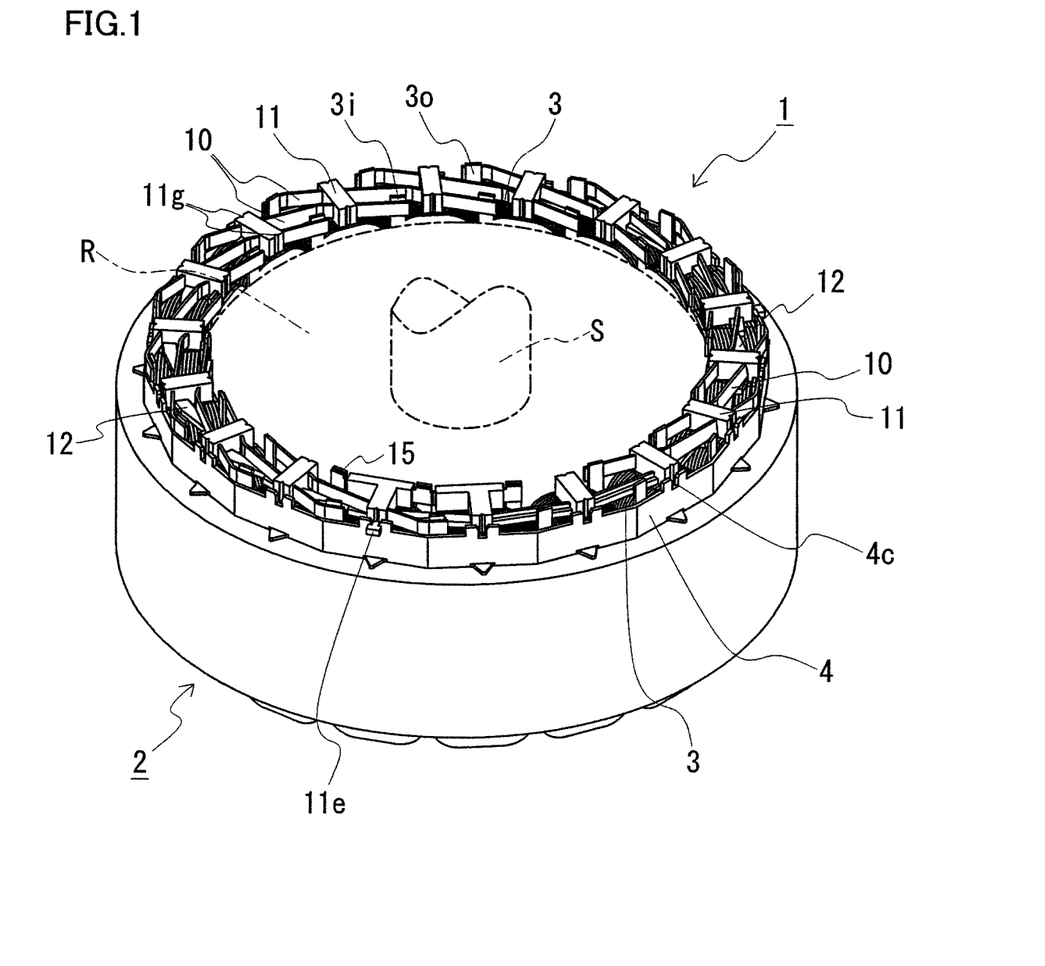
FIG. 1 is a perspective view showing a state where an electric power distribution member for stator according to the present invention is mounted on a stator.

FIG. 1 is a perspective view showing a state where an electric power distribution member for stator according to the present invention is mounted on a stator. The stator includes a stator core 2 and a coil 3 formed of a winding wound around each tooth in stator core 2, and coils 3 are connected to one another through an electric power distribution member 1. A motor is formed by rotatably arranging a rotor R, of which shaft S has been fixed, in the center of this stator.

Stator core 2 includes an integrated-type in which an annular yoke and teeth centripetally extending from this yoke are provided and the yoke and the teeth are integrally formed, and a divided-type in which a plurality of divided cores are combined. A stack structure formed by stacking silicon steel plates or a green compact formed by coating surfaces of magnetic powders such as iron powders with an insulating coating and pressure-forming the powders can be used for this stator core 2. The number of teeth is not particularly limited, however, the number is herein set to 18 and the number of coils 3 corresponds to the number of teeth.

Coil 3 is formed of a wound winding, and here, a coil obtained by employing, as the winding, a flat-type wire having a surface coated with an insulating coating except for opposing end portions and winding this flat-type wire edgewise is adopted. Each coil 3 has one end portion 3$i$ located on an inner circumferential side in a radial direction of the stator and has the other end portion 3$o$ located on an outer circumferential side in the radial direction of the stator. Each end portion 3$i$, 3$o$ of coil 3 is connected to an end portion of another coil 3 through a conductor piece 10 of electric power distribution member 1.

In addition, in order to maintain insulation between coil 3 and stator core 2, an insulator 4 is arranged between coil 3 and stator core 2. Insulator 4 has a cylinder portion arranged around an outer circumferential surface of a tooth and a flange portion formed on the outer circumferential side of the cylinder portion in the radial direction of the stator.

Figure 2:
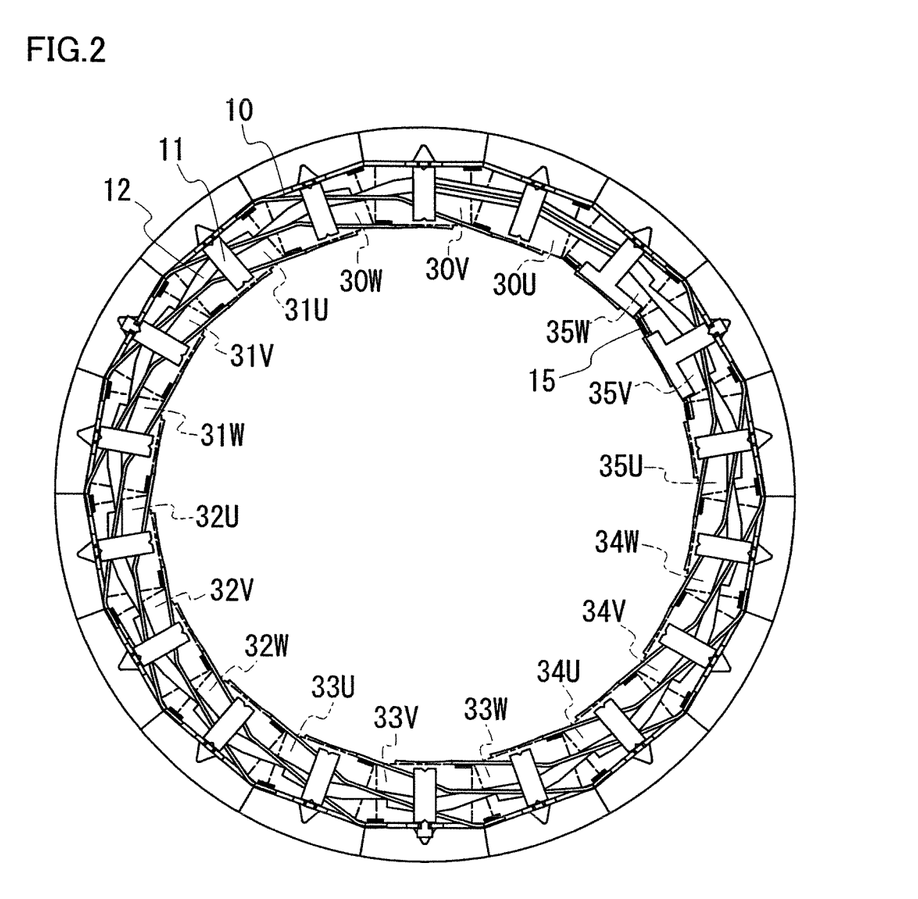
FIG. 2 is a plan view showing a state where the electric power distribution member for stator according to the present invention is mounted on the stator.

A specific coil connection structure will be described with reference to FIG. 2. An inner circumferential side end portion of a coil 30U and an outer circumferential side end portion of a coil 31U distant therefrom counterclockwise, with two coils being interposed, are connected to each other. Similarly, inner circumferential side end portions of coils 31U, 32U, 33U, and 34U are connected to outer circumferential side end portions of coils 32U, 33U, 34U, and 35U, respectively. Similarly in coils 30V to 35V and coils 30W to 35W, inner circumferential side end portions are connected to outer circumferential side end portions, respectively. Namely, coils 30U to 35U are connected in series, coils 30V to 35V are connected in series, and coils 30W to 35W are connected in series. In addition, inner circumferential side end portions of coils 35U, 35V and 35W are connected to one another by a conductor piece for neutral point 15, to thereby form a neutral point. Then, rotating magnetic field is generated by supplying AC currents different in phase to the outer circumferential side end portions of coils 30U, 30V and 30W, respectively.

Figure 3:
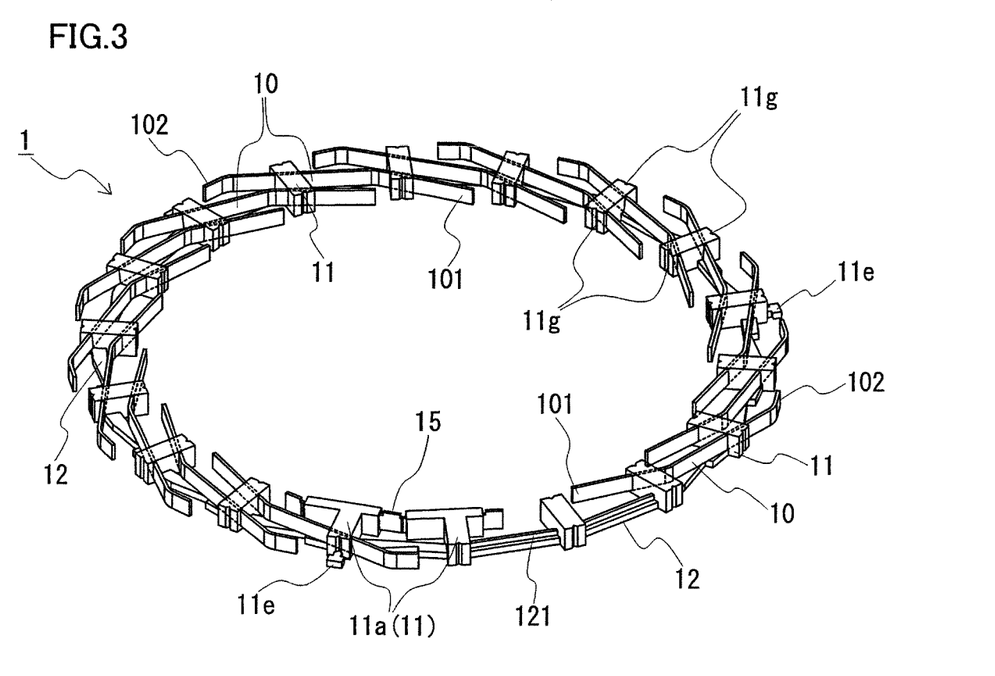
FIG. 3 is a perspective view of the electric power distribution member for stator according to the present invention.
Figure 4:
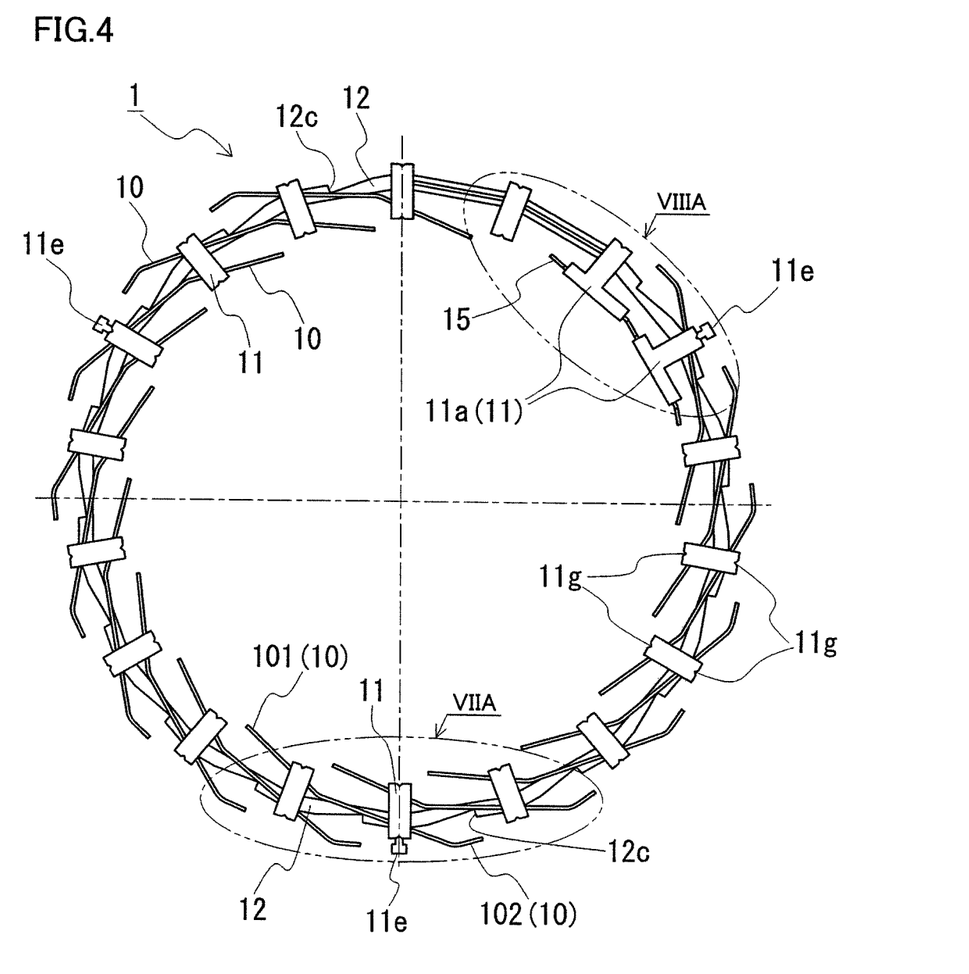
FIG. 4 is a plan view of the electric power distribution member for stator according to the present invention.

As shown in FIGS. 3 and 4, electric power distribution member 1 includes a plurality of conductor pieces 10, a plurality of insulating holding portions 11 integrally molded with conductor pieces 10, and a plurality of coupling portions 12 for annularly coupling these insulating holding portions 11.

Conductor piece 10 has a first connection end portion 101 connected to the inner circumferential side end portion of a coil and a second connection end portion 102 connected to the outer circumferential side end portion of another coil. Conductor pieces 10 are annularly arranged such that they are displaced in a circumferential direction in a partially overlapping manner, and conductor pieces 10 are integrated as they are coupled by insulating holding portion 11 at a portion other than opposing end connection portions.

Figure 5A:
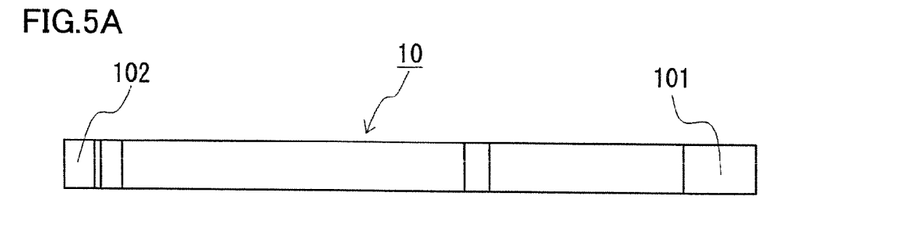
FIG. 5A is a front view of a conductor piece.
Figure 5B:
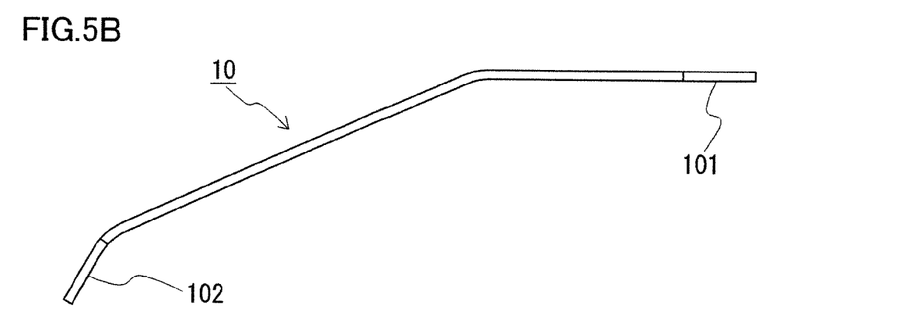
FIG. 5B is a plan view of the conductor piece.

As shown in FIGS. 5A and 5B, this conductor piece 10 is made of a flat-type copper wire having an insulating coating, and opposing connection end portions 101 and 102 are exposed through the insulating coating. In addition, conductor piece 10 is bent at two portions in a longitudinal direction for facilitated joint to end portions of each coil.

Figure 6A:
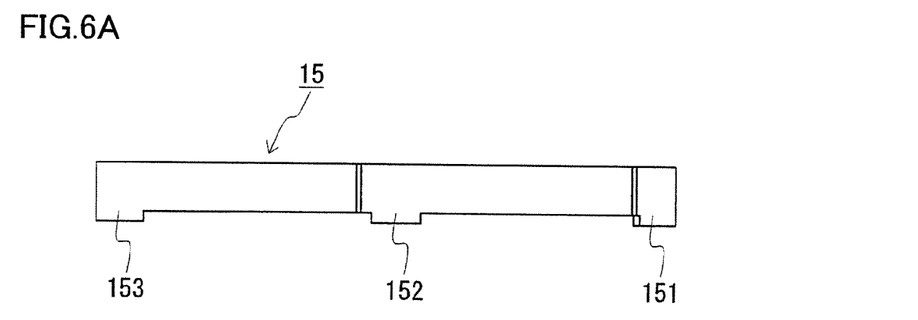
FIG. 6A is a front view of a conductor piece for neutral point.
Figure 6B:
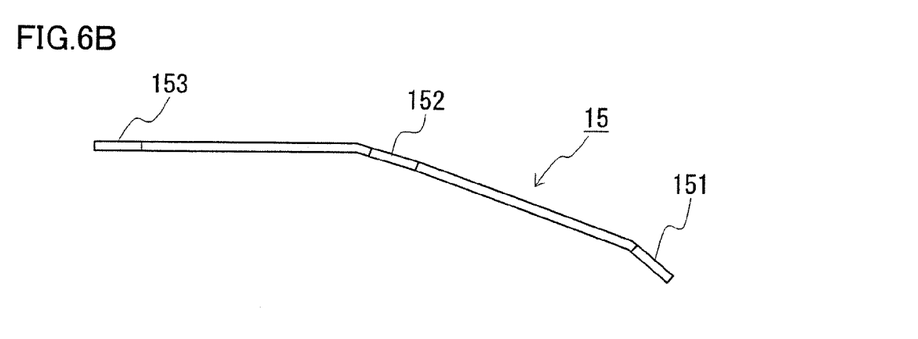
FIG. 6B is a plan view of the conductor piece for neutral point.

As shown in FIGS. 6A and 6B, conductor piece for neutral point 15 has connection portions 151 to 153 each connected to an end portion of a coil. Connection portions 151 to 153 are connected such that first connection portion 151 is connected to the inner circumferential side end portion of coil 35U, second connection portion 152 is connected to the inner circumferential side end portion of coil 35V, and third connection portion 153 is connected to the inner circumferential side end portion of coil 35W (see FIG. 2). Conductor piece for neutral point 15 is fabricated by punching a copper plate, and each of connection portions 151 to 153 is in a flat plate shape projecting in a direction of width. In addition, conductor piece for neutral point 15 is bent at two portions in a longitudinal direction for facilitated joint to end portions of coils.

Figure 7A:
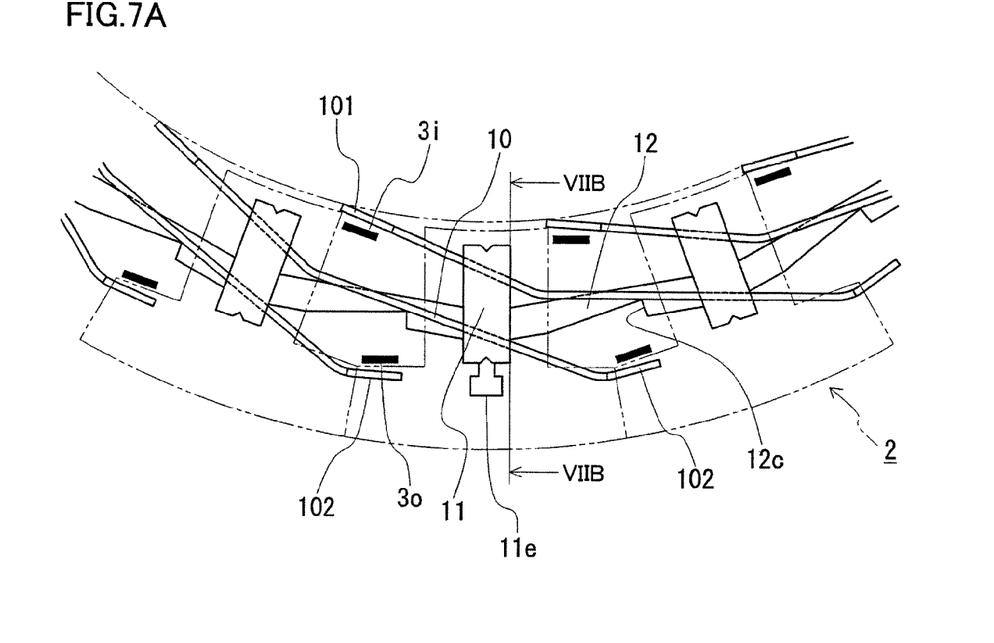
FIG. 7A is an enlarged view of a portion indicated with VIIA in FIG. 4, for illustrating an attachment structure of the electric power distribution member for stator according to the present invention.

In mounting the electric power distribution member on the stator, as shown in FIG. 7A, conductor piece 10 is arranged such that first connection end portion 101 is arranged on the inner circumferential side relative to inner circumferential side end portion 3i of a coil and second connection end portion 102 is arranged on the outer circumferential side relative to outer circumferential side end portion 3o of a coil. Consequently, as compared with an example where first connection end portion 101 is arranged on the outer circumferential side relative to inner circumferential side end portion 3i of a coil or second connection end portion 102 is arranged on the inner circumferential side relative to outer circumferential side end portion 3o of a coil, a distance between each connection end portion 101, 102 of a conductor piece and adjacent conductor piece 10 can be made greater. Therefore, in connecting conductor piece 10 to end portion 3i, 3o of each coil, insertion of a fixing jig (not shown) for clamping and fixing connection end portion 101 (102) of the conductor piece and end portion 3i (3o) of the coil from opposing sides is facilitated and a connection operation is facilitated. TIG welding is employed for connection of each connection end portion of a conductor piece and an end portion of each coil to each other.

In addition, TIG welding is also used for connection between each connection portion of a conductor piece for neutral point and an end portion of each coil. In conductor piece for neutral point 15, each of connection portions 151 to 153 projects in a direction of width, and a welding operation is facilitated by registering an end portion of each coil at this projection portion.

Figure 7B:
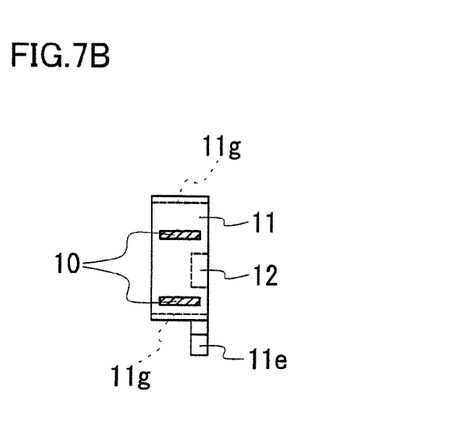
FIG. 7B is a cross-sectional view along the line VIIB-VIIB in FIG. 7A.
Figure 8A:
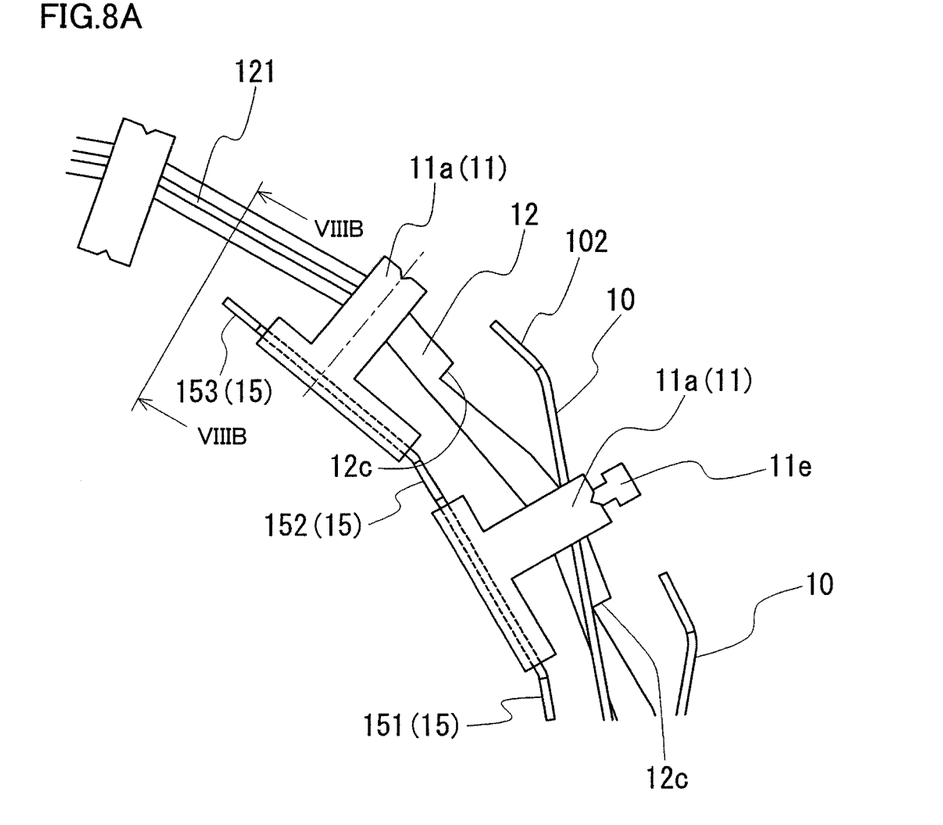
FIG. 8A is an enlarged view of a portion indicated with VIIIA in FIG. 4.
Figure 8B:
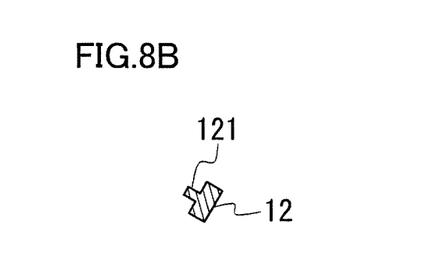
FIG. 8B is a cross-sectional view along the line VIIIB-VIIIB in FIG. 8A.

As shown in FIGS. 3, 4, 7A, and 7B, each insulating holding portion 11 is integrally molded between opposing end connection portions 101 and 102 so as to cover the outer periphery of a pair of adjacent conductor pieces 10 and to hold conductor pieces 10 at a distance from each other. Here, in mounting the electric power distribution member on the stator, insulating holding portion 11 is arranged on a centerline of each coil, and hence contact with end portion 3i, 3o of each coil, with each connection end portion 101, 102 of a conductor piece being bent, is facilitated. In addition, as shown in FIGS. 8A and 8B, an insulating holding portion 11a among the plurality of insulating holding portions 11 is molded in a substantially T-shape so as to hold conductor piece for neutral point 15 on the inner circumferential side in the radial direction of the stator.

An engagement portion 11e for positioning with respect to the stator is provided in three of the plurality of insulating holding portions 11. Engagement portion 11e is located below an intermediate position in a direction of height of insulating holding portion 11 and arranged so as not to impede grip of a grip portion 11g which will be described later by a manipulator (see FIG. 7B). This engagement portion 11e has a constriction portion and it is integrally molded with insulating holding portion 11 so as to project toward the outer circumferential side in the radial direction of the stator. In addition, a notch groove (a locking portion) 4c is provided in the flange portion of insulator 4 (see FIG. 1). Then, in mounting the electric power distribution member on the stator, by engaging the constriction portion of engagement portion 11e in notch groove 4c, the electric power distribution member can be positioned•fixed with respect to the stator.

Further, in insulating holding portion 11, a V-shaped groove (a grip portion) 11g is provided on each of inner and outer circumferential sides in the radial direction of the stator. Therefore, grip of insulating holding portion 11 by the manipulator is facilitated and lifting of the electric power distribution member in mounting the electric power distribution member on the stator is facilitated.

As shown in FIGS. 3 and 4, each coupling portion 12 is a bar-shaped member for coupling the plurality of insulating holding portions 11 and it is integrally molded with each insulating holding portion 11. These coupling portions 12 have a function to annularly hold conductor pieces 10 by annularly coupling the plurality of insulating holding portions 11. In addition, as shown in FIGS. 7A and 7B, since coupling portion 12 is smaller in height and width in the radial direction of the stator than insulating holding portion 11, a cross-sectional area thereof in a direction orthogonal to the circumferential direction is smaller than that of insulating holding portion 11. Coupling portion 12 may be shaped in a curved bar shape, in addition to a linear bar shape.

Further, in each coupling portion 12, a notch portion 12c as formed by cutting is provided in a surface opposed to second connection end portion 102 of a conductor piece. Therefore, in connecting second connection end portion 102 with outer circumferential side end portion 3o of a coil by inserting the fixing jig described above, interference between the fixing jig and coupling portion 12 is avoided and a connection operation is facilitated. Here, an example where notch portion 12c is provided in a surface opposed to second connection end portion 102 of a conductor piece is shown, however, a notch portion may be provided in a surface opposed to first connection end portion 101 or notch portions may be provided in respective surfaces opposed to both connection end portions 101 and 102.

As shown in FIGS. 3, 8A and 8B, coupling portions extending in opposing directions from insulating holding portion 11 not holding conductor piece 10 among the plurality of coupling portions 12 are each provided with a protruding portion 121 continuous in a circumferential direction, on a surface opposite to the coil, and it is molded to have a T-shaped cross-section. Therefore, a portion where conductor piece 10 is not arranged and strength is low can be reinforced and an annular shape can reliably be maintained. In addition, such a protruding portion may be provided in each coupling portion 12. If protruding portions are provided in all coupling portions 12, improvement in strength can be expected.

Since insulating holding portions 11 are provided partially in the circumferential direction, an amount of a material used can be suppressed as compared with an example where a plurality of conductor pieces are molded over the entire circumference. In addition, as described above, since coupling portion 12 has a cross-sectional area in a direction orthogonal to the circumferential direction smaller than that of insulating holding portion 11, an amount of a material used does not significantly increase either.

Electric power distribution member 1 above can be fabricated as follows. Initially, a mold including a plurality of conductor piece arrangement grooves in which conductor pieces are annularly arranged at a distance from one another, a plurality of resin fill portions that are portions other than opposing end connection portions of each conductor piece, provided in a manner discrete in the circumferential direction, and a coupling groove portion for coupling the resin fill portions is prepared. Then, after conductor pieces are arranged in the conductor piece arrangement grooves, resin is introduced in the mold so that the resin securely adheres to a part of each conductor piece, and the insulating holding portion for integrally holding adjacent conductor pieces is integrally molded to each conductor piece through outsert molding. Here, the coupling portion for coupling these insulating holding portions is integrally molded, together with each insulating holding portion.

(Variation)

Figure 9A:
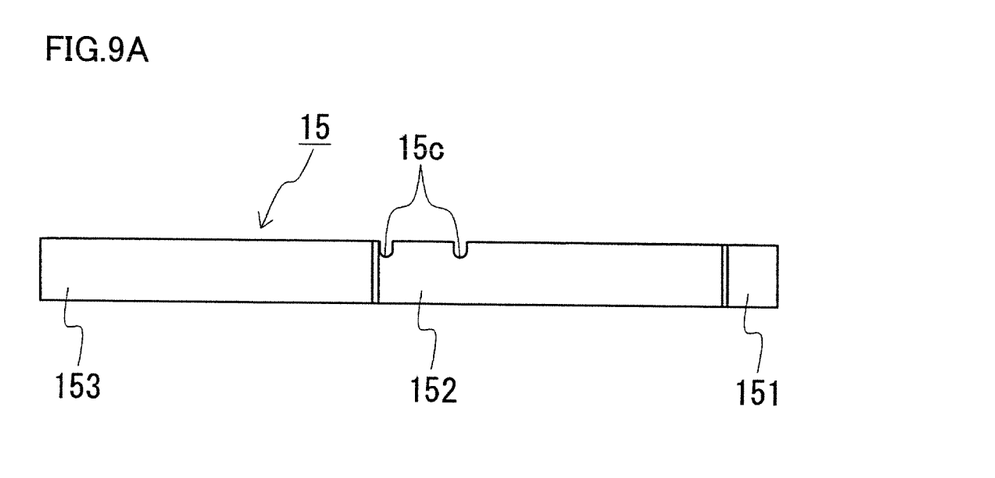
FIG. 9A is a front view showing another example of a conductor piece for neutral point.

FIG. 9A is a front view showing a variation of conductor piece for neutral point 15, of which shape is different from the conductor piece for neutral point described above; connection portions 151 to 153 to be connected to end portions of coils respectively do not project in a direction of width. Since such a conductor piece for neutral point 15 can be fabricated, for example, by bending a flat-type copper wire, it can be obtained without punching a copper plate, material loss is small and yield can be improved. In addition, notch portions 15c are provided on respective opposing sides of connection portion 152 located in the center among the connection portions. By providing notch portions 15c on respective opposing sides of connection portion 152, conduction of welding heat to the opposing end portion sides of conductor piece for neutral point 15 in joining connection portion 152 and an end portion of a coil to each other by welding can be suppressed and welding heat can locally be applied. Thus, a welding operation is facilitated. It is noted that notch portion 15c should only be formed by cutting or removing an outer peripheral portion of a flat-type copper wire.

Figure 9B:
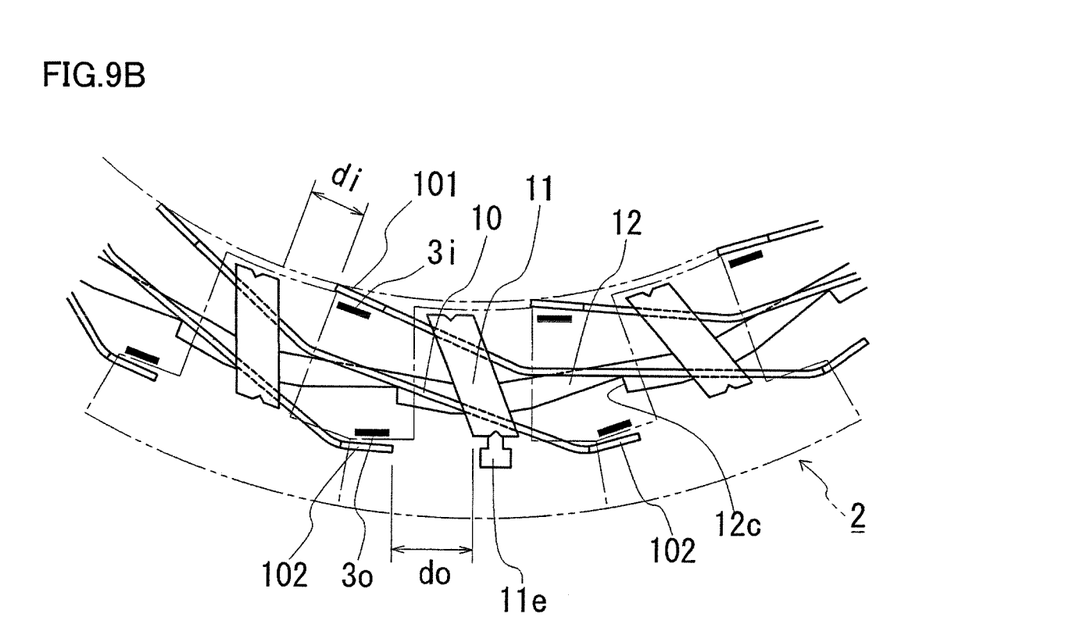
FIG. 9B is a partial enlarged view for illustrating another example of an electric power distribution member for stator.

FIG. 9B is a partial enlarged view for illustrating a variation of an electric power distribution member for stator, and it shows a state before mounting of an electric power distribution member on a stator as in FIG. 7A. Specifically, insulating holding portion 11 is different from that described above in a two-dimensional shape and insulating holding portion 11 has such a two-dimensional shape as inclined from first connection end portion 101 side of conductor piece 10 held by insulating holding portion 11 toward second connection end portion 102 side. For example, by shaping insulating holding portion 11 in a parallelogram as shown in FIG. 9B, a spatial distance di between the inner circumferential side of insulating holding portion 11 and first connection end portion 101 of a conductor piece and a spatial distance do between the outer circumferential side of insulating holding portion 11 and second connection end portion 102 of the conductor piece can be made greater. Therefore, in connecting connection end portion 101 (102) of a conductor piece and end portion 3i (3o) of a coil to each other, insertion of a fixing jig is facilitated and a connection operation is facilitated.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The electric power distribution member for stator according to the present invention can be utilized in a stator and a motor utilizing the same. In particular, the electric power distribution member for stator according to the present invention can suitably be utilized in the field of a motor for a car of which improvement in productivity is required.

DESCRIPTION OF THE REFERENCE SIGNS 1 electric power distribution member;
10 conductor piece; 101 first connection end portion; 102 second connection end portion;
11, 11a insulating holding portion; 11e engagement portion; 11g V-shaped groove;
12 annular coupling portion; 12c notch portion; 121 protruding portion;
15 conductor piece for neutral point; 15c notch portion;
151 first connection portion; 152 second connection portion; 153 third connection portion;
2 stator core;
3, 30U to 35U, 30V to 35V, 30W to 35W coil; 3i inner circumferential side end portion; 3o outer circumferential side end portion;
4 insulator; 4c notch groove;
R rotor; S shaft

The invention claimed is:

1. An electric power distribution member for stator for connecting a plurality of coils each having an inner circumferential side end portion and an outer circumferential side end portion located on an inner circumferential side and on an outer circumferential side in a radial direction of a stator respectively, the electric power distribution member comprising:
a plurality of conductor pieces each having first and second connection end portions in a flat plate shape, each of said plurality of conductor pieces serving to connect different ones of said plurality of coils between said first and second connection end portions, said first connection end portion being a portion to be connected to said inner circumferential side end portion, and said second connection end portion being a portion to be connected to said outer circumferential side end portion;
a plurality of insulating holding portions for integrally holding said plurality of conductor pieces at a distance from one another at a portion other than opposing connection end portions of each of said plurality of conductor pieces, said plurality of insulating holding portions being arranged in a manner discrete from one another; and
a coupling portion for annularly coupling said plurality of insulating holding portions.

2. The electric power distribution member for stator according to claim 1, wherein
at least one of said plurality of insulating holding portions has an engagement portion for positioning with respect to the stator.

3. The electric power distribution member for stator according to claim 1, wherein
each of said plurality of conductor pieces is formed of a flat-type wire.

4. The electric power distribution member for stator according to claim 1, wherein
each of said plurality of conductor pieces has an insulating coating.

5. The electric power distribution member for stator according to claim 1, wherein
at least one of said plurality of insulating holding portions has a grip portion to be gripped by a manipulator.

6. The electric power distribution member for stator according to claim 1, wherein said plurality of insulating holding portions include an insulating holding portion having a two-dimensional shape extending in a direction tilted with respect to a radial direction of said stator, and said tilted direction is a direction from a side of said first connection end portion of a conductor piece held by said insulating holding portion among said plurality of conductor pieces toward a side of said second connection end portion.

7. An attachment structure of an electric power distribution member for stator, for connecting the electric power distribution member for stator to a coil of a stator,
said electric power distribution member for stator being the electric power distribution member for stator according to claim 1,
said coil having opposing end portions in a flat plate shape, and
each connection end portion of said conductor piece being connected by welding to an end portion of each coil.

8. The attachment structure of an electric power distribution member for stator according to claim 7, wherein
said first connection end portion is arranged on an inner circumferential side relative to said inner circumferential side end portion, and said second connection end portion is arranged on an outer circumferential side relative to said outer circumferential side end portion.

9. A stator, comprising the attachment structure of an electric power distribution member for stator according to claim 7.

10. An electric power distribution member for stator for connecting a plurality of coils each having an inner circumferential side end portion and an outer circumferential side end portion located on an inner circumferential side and on an outer circumferential side in a radial direction of a stator respectively, the electric power distribution member comprising:
a plurality of conductor pieces each having first and second connection end portions in a flat plate shape, each of said plurality of conductor pieces serving to connect different ones of said plurality of coils between said first and second connection end portions, said first connection end portion being a portion to be connected to said inner circumferential side end portion, and said second connection end portion being a portion to be connected to said outer circumferential side end portion; and
a plurality of insulating holding portions for integrally holding said plurality of conductor pieces at a distance from one another at a portion other than opposing connection end portions of each of said plurality of conductor pieces, said plurality of insulating holding portions being arranged in a manner discrete from one another,
wherein at least one of said plurality of insulating holding portions has a grip portion to be gripped by a manipulator.

11. An electric power distribution member for stator for connecting a plurality of coils each having an inner circumferential side end portion and an outer circumferential side end portion located on an inner circumferential side and on an outer circumferential side in a radial direction of a stator respectively, the electric power distribution member comprising:
a plurality of conductor pieces each having first and second connection end portions in a flat plate shape, each of said plurality of conductor pieces serving to connect different ones of said plurality of coils between said first and second connection end portions, said first connection end portion being a portion to be connected to said inner circumferential side end portion, and said second connection end portion being a portion to be connected to said outer circumferential side end portion; and
a plurality of insulating holding portions for integrally holding said plurality of conductor pieces at a distance from one another at a portion other than opposing connection end portions of each of said plurality of conductor pieces, said plurality of insulating holding portions being arranged in a manner discrete from one another,
wherein said plurality of insulating holding portions include an insulating holding portion having a two-dimensional shape extending in a direction tilted with respect to a radial direction of said stator, and said tilted direction is a direction from a side of said first connection end portion of a conductor piece held by said insulating holding portion among said plurality of conductor pieces toward a side of said second connection end portion.

* * * * *